United States Patent
Davies et al.

(10) Patent No.: US 6,915,280 B1
(45) Date of Patent: Jul. 5, 2005

(54) METHOD AND APPARATUS FOR PRINTING POSTAGE

(75) Inventors: Brad Davies, Trumbull, CT (US); Andrew Zink, Stafford Springs, CT (US)

(73) Assignee: Pitney Bowes Inc., Stamford, CT (US)

(*) Notice: Subject to any disclaimer, the term of this patent is extended or adjusted under 35 U.S.C. 154(b) by 906 days.

(21) Appl. No.: 09/201,919

(22) Filed: Dec. 1, 1998

(51) Int. Cl.$^7$ .................................... G06F 17/60
(52) U.S. Cl. ................. 705/408; 705/51; 705/400; 705/404; 705/405; 705/406
(58) Field of Search .............. 705/51, 401, 404, 705/405, 408, 406, 400

(56) References Cited

U.S. PATENT DOCUMENTS

| | | | |
|---|---|---|---|
| 5,081,579 A | | 1/1992 | Komai et al. ............... 364/405 |
| 5,651,103 A | | 7/1997 | Arsenault et al. ........... 395/117 |
| 5,707,158 A | * | 1/1998 | Hansel et al. ................ 400/61 |
| 5,729,461 A | * | 3/1998 | D'Andrea et al. ....... 364/464.18 |
| 6,050,486 A | * | 4/2000 | French et al. ............... 235/101 |
| 6,085,180 A | * | 7/2000 | Beer et al. .................. 705/401 |
| 6,108,643 A | * | 8/2000 | Sansone ....................... 705/62 |

FOREIGN PATENT DOCUMENTS

| EP | 566225 A2 | * 10/1993 | ........... G07B/17/00 |

OTHER PUBLICATIONS

"Mail Power: How a fully automated mail center can help any business", Michael Maguire, Office Systems, v9n8, pp. 44–51, Aug. 1992.*

* cited by examiner

Primary Examiner—James P. Trammell
Assistant Examiner—Calvin L Hewitt, II
(74) Attorney, Agent, or Firm—Alberta A. Vitale; Charles R. Malandra; George M. Macdonald

(57) ABSTRACT

The present invention is a postage meter apparatus and method for printing in which print software is decoupled from print data such that print image data can change without impacting software. The decoupling can be performed using distributed architecture. Additionally, tables are used to decouple the print software from the print data.

17 Claims, 3 Drawing Sheets

METHOD AND APPARATUS FOR PRINTING POSTAGE

FIELD OF THE INVENTION

The present invention relates to printing in general and in particular to a method and apparatus for printing postage.

BACKGROUND OF THE INVENTION

Traditional postage meters print an indicia on a mailpiece as evidence that postage has been paid. Traditional mechanical postage meters create the indicia using a platen or a rotary drum which is moved into contact with the mailpiece to imprint the indicia thereon. While traditional postage meters have performed admirably over time, they are limited by the need to replace the platen or rotary drum when significant changes to the indicia image are made. Electronic postage meters use modern digital technology to overcome the need to replace the platen or drum when changes are made to the indicia.

Digital technology uses digital printheads to print postage indicia. Software drives the printheads to print indicia on the mailpieces. When an image is significantly changed, new software must be loaded into the digital postage meter. Thus, while the digital postage meters present advantages over traditional mechanical postage meters, in that they do not require replacement of parts in order to change the image, they do require changes to software in order to change the indicia image. Software changes, while more convenient to incorporate than hardware changes, can be problematic in that each time software is enhanced or changed, there is opportunity for new problems or "bugs" to be introduced into the software, thus affecting reliability. Additionally, software changes can be time consuming because they require reprogramming and testing.

Printing postage indicia images using electronic postage meters, such as electronic postage meters incorporating ink jet printing technology, requires that the image be converted into a bit mapped image. The bit map contains a dot matrix pattern representative of the desired indicia. Individual print elements in the print head, in response to the bit mapped image, are either electronically stimulated or not stimulated to expel or not expel, respectively, drops of ink from a reservoir onto a mailpiece.

Postage meters utilizing digital printing technology typically combine the fixed and variable image data into a complete bit map indicia image prior to printing. The image is conventionally combined by dedicating an electronic read-write memory (i.e., random access memory (RAM)) for use as temporary storage during the image element gathering stage. That is, while image data for the fixed and variable data are stored in a non-volatile memory (NVM), when an individual transaction takes place the postage meter microprocessor obtains the required variable and fixed data elements for that transaction from the non-volatile memory and combines and downloads the required variable image data into the electronic read-write memory as a bit map of the actual entire indicia to be printed, thereby using the RAM as temporary storage of the bit mailpiece image. The microprocessor then downloads the bit map image to the printhead for printing. However, since the variable image data changes from mailpiece to mailpiece, the microprocessor must edit the bit map image for every indicia printed. Editing an indicia bit map image significantly affects the performance and cost of the postage meter since it 1) takes time to do thereby reducing throughput; 2) requires a large amount of RAM; 3) demands the use of a high speed microprocessor; and 4) requires a large amount of additional code and associated memory to perform the editing function.

Electronic postage meters utilizing RAM for storage of bitmap indicia image require reconfiguration when fixed portions of the indicia image are changed. The reconfiguration is performed by the manufacturer by hardcoding the changes into software. The meter vault is not removable and thus the meter cannot be reconfigured at a customer location; it must be retrieved from the customer and reconfigured at a manufacturing facility. Similarly, different configuration and different software are used to print an indicia in a different language or different formats for post offices of various countries. Thus, a different meter must be built for each country of use.

Other electronic postage meters utilizing NVM for instructions to create bitmaps do not have removable meters vaults. Thus, when an image needs to be changed, for instance, when a meter will be used in a different country, the meter cannot be easily replaced.

One of the problems of the prior art is that the software needs revising when a different indicia format, such as a format for another country, needs to be printed. Another problem of the prior art is that the meter is not replaceable. Another problem of the prior art is that reconfiguration of the software cannot be performed at a customer site.

SUMMARY OF THE INVENTION

The present invention overcomes the disadvantages of the prior art by providing a printing method that allows the printer software to remain generic and the meter software to contain updates and reports without requiring updates to printer software. This is performed by partitioning the print function between the meter and the print head controller. Tables are also used to store image and font data formats. Also, the meter vault is removable, which facilitates easier changes to the meter data.

In one embodiment, the present invention provides an apparatus for printing an image which uses a distributed configuration, which includes a nonvolatile memory for storing data structures and data definitions for generating print images; a microprocessor in the print apparatus for processing print data using print manager software; a removable microprocessor in the meter for processing image data and data definitions to create a data message using data-providing software in the meter microprocessor; printing device comprising a print head controller which receives a bit map image corresponding to the data message from the non-volatile memory; whereby the print manager software in the printer microprocessor receives the data message from the data-providing software and retrieves corresponding print images or bit maps from the non-volatile memory and sends the bit maps to the printing device. The distributed configuration allows the meter to be replaced in order to provide different graphics. The image data and data definitions give the apparatus a flexible way of formatting a data message for printing. Therefore, image data and data definitions do not need to be changed when the meter is reconfigured for printing different graphics.

In another embodiment, the postage meter device has one microprocessor which resides in the meter. The data providing software and the print manager software share the processing time. As in the distributed configuration, the meter is removable and may be replaced in order to provide different graphics, and the image data and data definitions do not need to be changed when the meter is reconfigured for printing different graphics.

The table-driven, distributed configuration of the present invention provides a flexible configuration for changing graphics and an efficient use of microprocessors and memory. Meter maintenance is easily performed by swapping the meter vault with a new meter vault. The print image may be changed without impacting software code. Printing is performed with efficient use of resources. The postage meter apparatus prints a variable combination of data fields.

DESCRIPTION OF THE PREFERRED EMBODIMENT(S)

Figure 1:
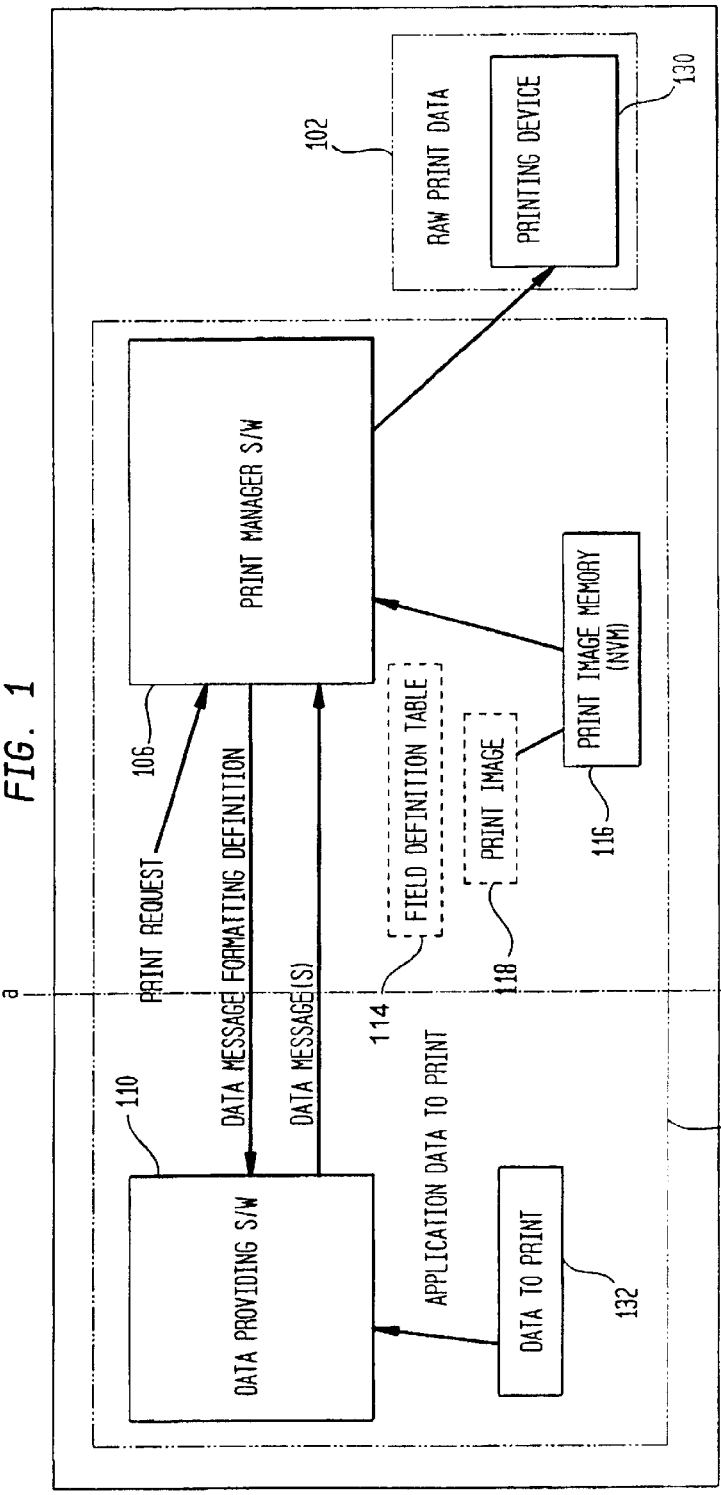
FIG. 1 is a block diagram of one embodiment of the postage meter apparatus illustrating the flow of data in the printing process. Line a—a illustrates the dividing line of a distributed configuration of FIG. 4b.

In describing the preferred embodiment of the present invention, reference will be made herein to FIGS. 1–4 of the drawings in which like numerals refer to like features of the invention. Features of the invention are not necessarily shown to scale in the drawings.

FIG. 1 illustrates the flow of data in a print cycle of a postage meter apparatus 100. Postage meter apparatus 100 comprises a meter apparatus or vault 104 and a printer apparatus 102. An operating system provides print manager software 106 and data providing software 110. A data structure or field definition table 114 is retrieved from print image memory 116 by the print manager software 106. Print image memory 116 can be, for example, flash or non-volatile memory (NVM). The print image memory 116 is the specific memory in which graphics information is stored as field definition tables 114 and print images or bit maps 118. The print manager software 106 sends the field definition table 114 to the data providing software 110. The data providing software 110 builds a data message and sends the data message back to the print manager software 106 which send the corresponding image to the printing device 130 and prints an indicia, such as, for example, the indicia 200, illustrated in FIG. 2, or other image or document. Such other documents include, but are not limited to, test patterns and reports or any other image programmed into the print image memory. Application data to print 132 is in ASCII format data and may include any combination of date, zip code or postage amount, or other appropriate data.

Figure 2:
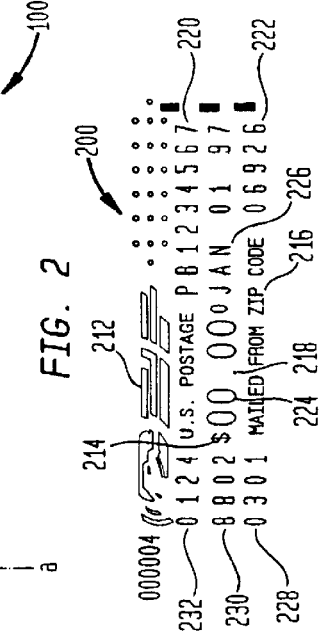
FIG. 2 is a postage indicia illustrating the components of the indicia including background graphics, static graphics and debit command graphics.

FIG. 2 illustrates a postal indicium 200 prepared in accordance with the present invention. The postal indicium comprises static graphics, background graphics and debit command graphics. The background graphics comprise an eagle 212, a dollar sign 214, a phrase "mailed from zip code" 216 and a decimal point 218. The background graphics are stored as bit mapped images in the print image memory 116. Static graphics comprise a serial number 220 and a zip code 222 for which field definition tables are stored in print image memory 116. The debit command graphics of the indicia are printed from data messages which are built using field definition tables stored in the print image memory and variable meter information which may be input by a user. For example, in the indicia of FIG. 2, debit command graphics comprise a postage amount 224, a date 226, and digital tokens 228, 230 and 232.

Figure 3:
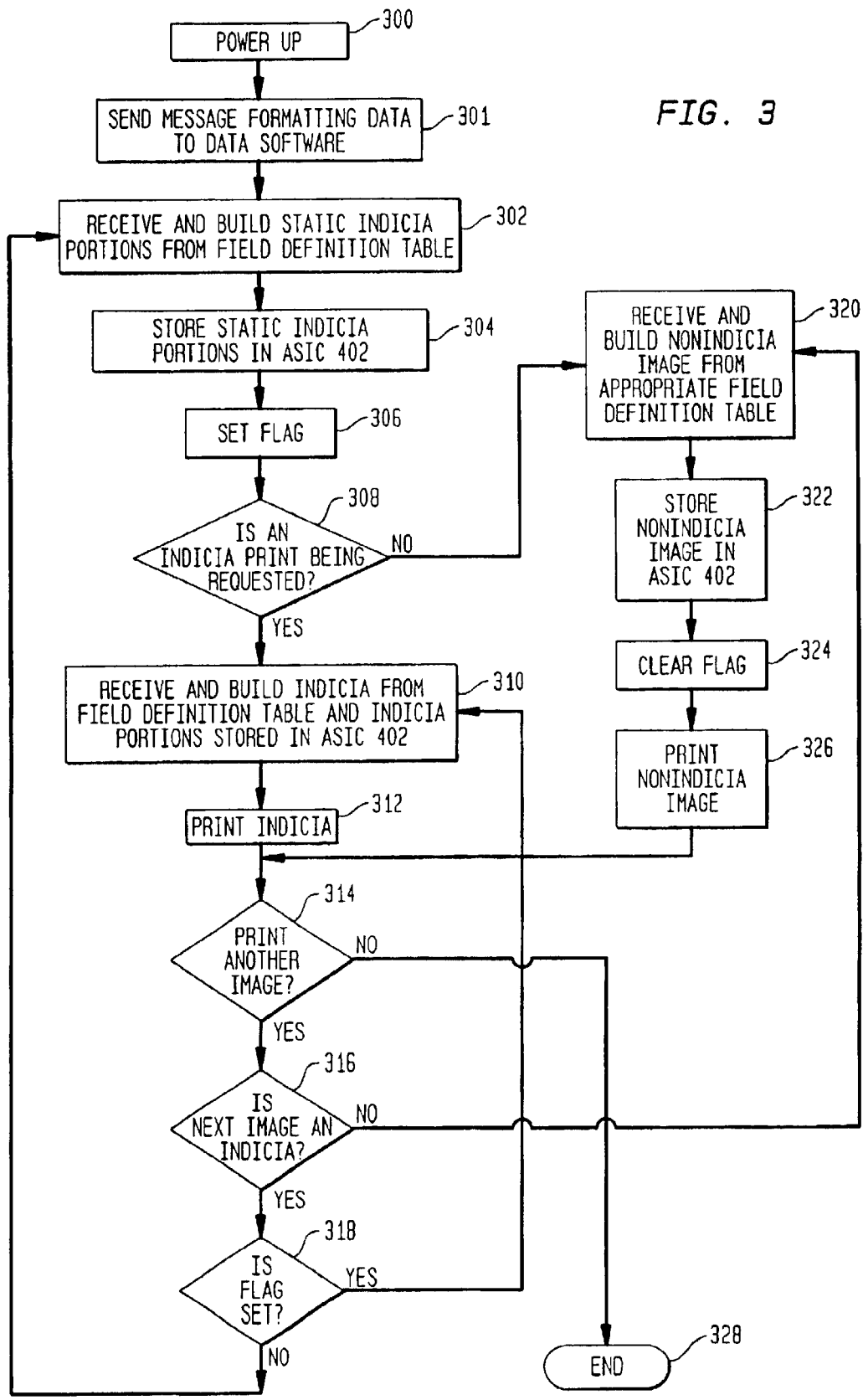
FIG. 3 is a flow chart illustrating the various steps for building indicia and nonindicia print images.

FIG. 3 is a flowchart illustrating the various steps for building indicia and nonindicia print images for one embodiment of the postage meter apparatus 100. At step 300, the postage meter apparatus 100 is powered up. At step 301, message formatting data is sent to data providing software 110. At step 302, after power up of the postage meter apparatus 100, the field definition tables for the static graphics including the serial number 220 and the zip code 222 are received and processed by the data providing software 110 to create a data message corresponding to the static graphic elements. At step 304, the data message is received by print software and the software sets up the ASIC 402 and may be used to create an indicia unless it is overwritten by other information subsequently stored in ASIC 402. At step 306, a flag is set indicating storage of the static graphics in the ASIC 402. At step 308, it is determined whether an indicia print is being requested. If an indicia is to be printed, at step 312, the indicia is built from field definition tables stored in the print image memory 116 and from the static graphics portions stored in the ASIC 402. At step 312, the indicia is printed. At step 314 it is determined whether another image is to be printed. If another image is not to be printed, the process ends at step 328. If another image is to be printed, it is determined whether that image is an indicia image at step 316. If a nonindicia image is to be printed, at step 320, that image is built from the field definition tables. At step 322 the nonindicia image is stored in the ASIC 402, overwriting the static graphics previously stored in the ASIC 402 in step 304. At step 324, the flag is cleared indicating that the static graphics are no longer stored in the ASIC 402. At step 326, the nonindicia image is printed. If, after printing the nonindicia image, another image print is requested at step 314, and it is determined that that image is an indicia at step 316, it is determined whether the flag is set at step 318. If the flag is not set at step 318, steps 302 through 312 are repeated. If the flag is set at step 318, step 310 through 312 are repeated. If, after printing another indicia at step 312 or other image at step 326, no other printing is requested, the process ends at step 328.

Table 1 illustrates field definition tables for four example fields for the postage indicia illustrated in FIG. 2. The example fields are postage 224, date 226, serial number 220 and zip code 222. The postage and date fields are debit command graphics fields which may be subject to user inputs. The serial number and zip code fields are static graphics fields which are built at power up of the meter, as illustrated in the flow chart of FIG. 3, and stored in ASIC 402. The static graphic fields may require rebuilding subsequent to the printing of an image other than an indicia image, as illustrated at steps 302 through 306 in the flow chart of FIG. 3. The field definition tables of Table 1 are read from the print image memory 116 by print manager software 106 and sent to the data providing software 110 which processes the field definition tables, using data element definitions programmed into microprocessor 402 of FIGS. 4a and 4b, builds data messages, such as, for example, the corresponding data messages illustrated in Tables 2 and 3. Example data element definitions are illustrated in Table 4. A number of data element definitions can be programmed into microprocessor 402 so that the apparatus 100 can print corresponding fields. The number of data element definitions which may be programmed into microprocessor 402 is limited by the configuration of the microprocessor 402. Table 1 illustrates field definition tables and font tables for each field. For example, the postage field definition table at addresses M+2 through M+6 of the print image memory corresponds to the postage font table at addresses N+26 through N+27. Thus, when a data message is built using the field definition table and corresponding font table which are corresponding arrays of information, the data message provides information which directs the print head of FIG. 4 to print characters from corresponding bit mapped images stored in the print image memory 116.

TABLE 1

FIELD DEFINITION TABLE FOR EXAMPLE POSTAGE, SERIAL NUMBER, DATE AND ZIP CODE

| FIELD | ADDRESS | MEMBER | VALUE | EXPLANATION |
|---|---|---|---|---|
| NUMBER OF FIELDS | M + 0 | NUMBER OF FIELDS | 4 | FOUR FIELDS |
| POSTAGE | M + 2 | FIELD ID | 4 | POSTAGE |
|  | M + 3 | MESSAGE ID | 0 | ENCRYPTED DEBIT COMMAND |
|  | M + 4 | MESSAGE OFFSET | 0 | NONE |
|  | M + 5 | FIELD SIZE | 5 | 5 DIGITS |
|  | M + 6 | JUSTIFICATION | 1 | RIGHT JUSTIFY |
| SERIAL NUMBER | M + 7 | FIELD ID | 0 | SERIAL NO. |
|  | M + 8 | MESSAGE ID | 1 | STATIC |
|  | M + 9 | MESSAGE OFFSET | 0 | NONE |
|  | M + 10 | FIELD SIZE | 9 | 9 DIGITS |
|  | M + 11 | JUSTIFICATION | 1 | RIGHT JUSTIFY |
| DATE | M + 12 | FIELD ID | 11 | INDICIA DATE |
|  | M + 13 | MESSAGE ID | 0 | ENCRYPTED DEBIT COMMAND |
|  | M + 14 | MESSAGE OFFSET | 5 | OFFSET 5 |
|  | M + 15 | FIELD SIZE | 9 | 9 DIGITS |
|  | M + 16 | JUSTIFICATION | 1 | RIGHT JUSTIFY |
| ZIP CODE | M + 17 | FIELD ID | 10 | ZIP CODE |
|  | M + 18 | MESSAGE ID | 1 | STATIC |
|  | M + 19 | MESSAGE OFFSET | 9 | OFFSET 9 |
|  | M + 20 | FIELD SIZE | 5 | FIVE DIGITS |
|  | M + 21 | JUSTIFICATION | 1 | RIGHT JUSTIFY |
| POSTAGE FONT | N + 22 | FONT ID | 0 | BIG FONT |
|  | N + 23 | REGISTER NO. | 0 | ASIC REGISTER |
| SERIAL NO. FONT | N + 24 | FONT ID | 1 | SMALL FONT |
|  | N + 25 | REGISTER NO. | 5 | ASIC REGISTER |
| DATE FONT | N + 26 | FONT ID | 1 | SMALL FONT |
|  | N + 27 | REGISTER NO. | 14 | ASIC REGISTER |
| ZIP FONT | N + 28 | FONT ID | 1 | SMALL FONT |
|  | N + 33 | REGISTER NO. | 23 | ASIC REGISTER |

Tables 2 and 3 illustrate example data messages corresponding to the field definition table of Table 1. Table 2 illustrates debit command graphics data messages including postage of 32 cents and date of January 01, 1997. An "X" in the value column indicates a space to be positioned between characters in the printed indicia. Table 3 illustrates static graphics data messages including serial number PB1234567 and zip code 06926. The data messages of Table 2 and Table 3 correspond to the debit command graphics and static graphics illustrated in example indicia of FIG. 2.

TABLE 2

DATA MESSAGES FOR ENCRYPTED DEBIT COMMAND GRAPHICS INCLUDING POSTAGE AND DATE OF FIELD DEFINITION TABLES OF TABLE 1.

| BYTE | VALUE | EXPLANATION |
|---|---|---|
| 0 | 0 | POSTAGE DIGIT 1 |
| 1 | 0 | POSTAGE DIGIT 2 |
| 2 | 3 | POSTAGE DIGIT 3 |
| 3 | 2 | POSTAGE DIGIT 4 |
| 4 | 0 | POSTAGE DIGIT 5 |
| 5 | J | DATE DIGIT 1 |
| 6 | A | DATE DIGIT 2 |
| 7 | N | DATE DIGIT 3 |
| 8 | X | DATE DIGIT 4 |
| 9 | 0 | DATE DIGIT 5 |
| 10 | 1 | DATE DIGIT 6 |
| 11 | X | DATE DIGIT 7 |
| 12 | 9 | DATE DIGIT 8 |
| 13 | 7 | DATE DIGIT 9 |

TABLE 3

DATA MESSAGES FOR STATIC INDICIA GRAPHICS INCLUDING SERIAL NUMBER AND ZIP CODE OF FIELD DEFINITION TABLES OF TABLE 1.

| BYTE | VALUE | EXPLANATION |
|---|---|---|
| 0 | P | SERIAL NO. DIGIT 1 |
| 1 | B | SERIAL NO. DIGIT 2 |
| 2 | 1 | SERIAL NO. DIGIT 3 |
| 3 | 2 | SERIAL NO. DIGIT 4 |
| 4 | 3 | SERIAL NO. DIGIT 5 |
| 5 | 4 | SERIAL NO. DIGIT 6 |
| 6 | 5 | SERIAL NO. DIGIT 7 |
| 7 | 6 | SERIAL NO. DIGIT 8 |
| 8 | 7 | SERIAL NO. DIGIT 9 |
| 9 | 0 | ZIP CODE DIGIT 1 |
| 10 | 6 | ZIP CODE DIGIT 2 |
| 11 | 9 | ZIP CODE DIGIT 3 |
| 12 | 2 | ZIP CODE DIGIT 4 |

TABLE 4

DATA ELEMENT DEFINITIONS FOR POSTAGE, SERIAL NUMBER, ZIPCODE AND SERIAL NUMBER.

| FIELD NAME | DEFINITION | EXPLANATION |
|---|---|---|
| MESSAGE ID |  |  |
| 0 | ENCRYPTED DEBIT COMMAND | MESSAGE ID FOR PRINT CONTENT MESSAGE |
| 1 | STATIC PRINT PARAMETERS | FROM THE METER TO THE PRINTHEAD |

TABLE 4-continued

DATA ELEMENT DEFINITIONS FOR POSTAGE, SERIAL NUMBER, ZIPCODE AND SERIAL NUMBER.

| FIELD NAME | DEFINITION | EXPLANATION |
|---|---|---|
| FIELD ID | | |
| 0 | INDICIA SERIAL NO. | FIELD ID IDENTIFIES |
| 4 | POSTAGE | THE FIELD TYPE TO BE |
| 10 | ZIP CODE | PRINTED |
| 11 | INDICIA DATE | |
| JUSTIFICATION | | |
| 0 | LEFT | FIELD JUSTIFICATION |
| 1 | RIGHT | |

Figure 4A:
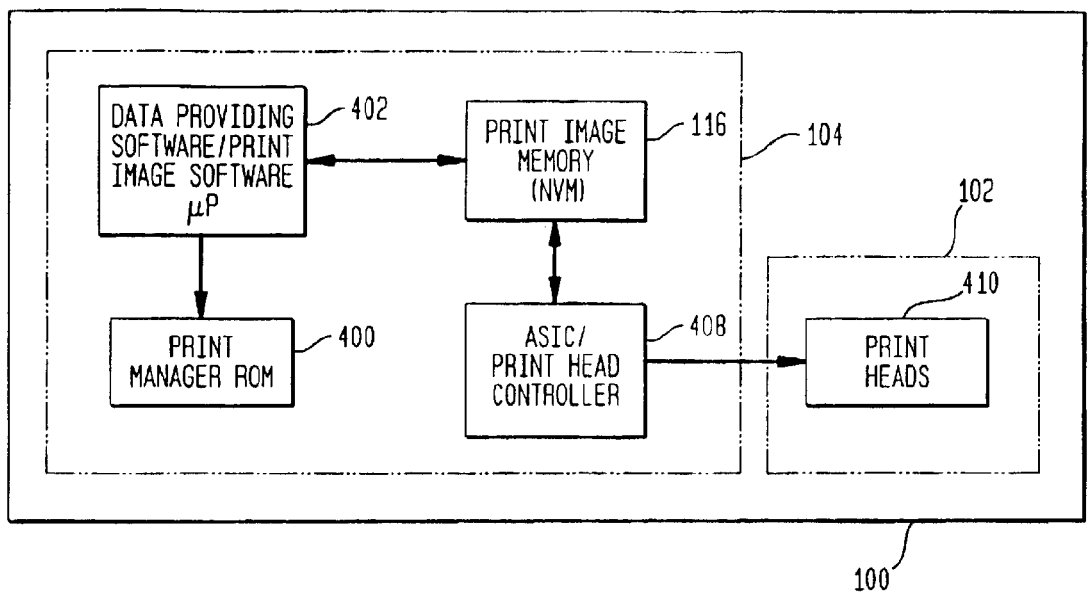
FIG. 4a is a block diagram of the hardware components of the postage meter apparatus of one embodiment of the present invention.
Figure 4B:
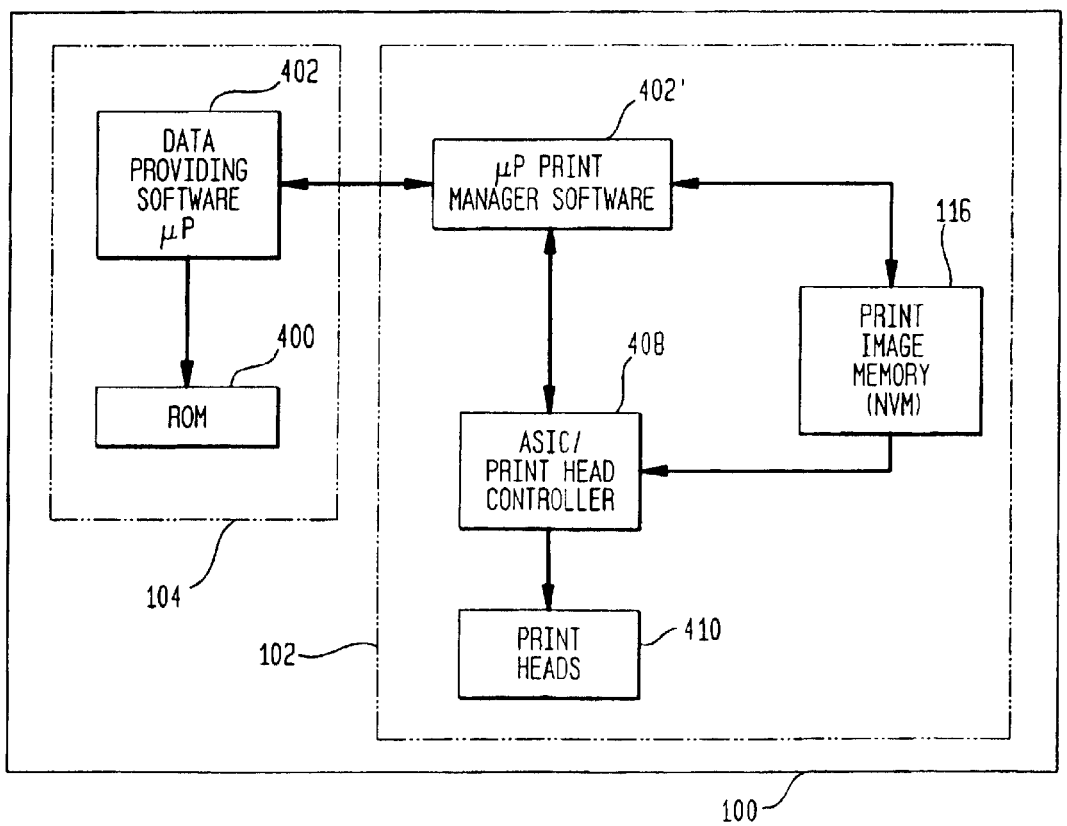
FIG. 4b is a block diagram of the hardware components of the postage meter apparatus of one embodiment of the present invention and illustrating the distributed configuration along line a—a of FIG. 1.

FIGS. 4a and 4b are block diagrams illustrating various hardware configurations of the postage meter apparatus 100 hardware. In FIG. 4a, the postage meter apparatus 100 comprises meter apparatus 104 and printer apparatus 102. The meter apparatus 104 comprises control device or ASIC 408 which may be a column-by-column printing control ASIC (drawing engine 39) disclosed in Arsenault et al., U.S. Pat. No. 5,651,102 titled MAIL HANDLING APPARATUS AND PROCESS FOR PRINTING AN IMAGE COLUMN-BY-COLUMN IN REAL TIME, the disclosure of which is hereby incorporated by reference. Additionally, the meter apparatus 104 includes microprocessor 402, read only memory (ROM) 400, and print image memory 116. Printer apparatus 102 includes print heads 410 for printing images, reports and other information. The software, including data providing software 110 and print manager software 106 is stored in ROM 400 and executed by microprocessor 402. FIG. 4b illustrates an alternate embodiment with a distributed hardware. The configuration of the postage meter apparatus 100 comprises meter apparatus 104 and printer apparatus 102. In the distributed configuration, both the meter apparatus 104 and the printer apparatus 102 include microprocessors. The meter apparatus 104 comprises microprocessor 402 and ROM 400. The printer apparatus comprises microprocessor 402', ASIC 408 and print heads 410. The data providing software 110 is stored in ROM 400 associated with microprocessor 402 and print manager software 106 is stored in microprocessor 402'. Distributed refers to a system which has more than one processor. The distributed configuration could also be performed with multiple microprocessors in one portion of the postage meter apparatus 100, such as, for example, multiple microprocessors in the meter apparatus 104. Line a—a of FIG. 1 illustrates the division of the distributed configuration of FIG. 4b. The software 106 and 110 in the configuration of FIG. 4a performs similarly to that of the distributed configuration of FIG. 4b in that each program 106 and 110 is stored and run separately and microprocessor 402 processing time is shared between the programs.

The configuration of FIG. 4a provides for image data to be stored in the meter apparatus 104 and such meter apparatus may be moved to other postage meter apparatus. The print head apparatus 102 processor can not be removed and therefore, image data is not stored in the print head apparatus 102. Additionally, the use of the postage meter apparatus 104 for storage of graphic data facilitates efficient use of computing resources since sufficient memory is available in the ROM 400 of the postage meter apparatus 104. The advantage of the distributed configuration of FIG. 4b is that the meter can be replaced in order to provide different graphics.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

We claim:

1. A method of printing using a postage evidencing device comprising:
    (a) storing a data structure and data definitions in a nonvolatile memory, the data structure including data for generating a print image and creating a data message and the data definitions corresponding to the data for generating a print image;
    (b) retrieving the data structure and the data definitions from the nonvolatile memory;
    (c) processing with a microprocessor the data structure and data definitions to create the data message;
    (d) sending the data message to a printer control device, the control device capable of retrieving a corresponding image in nonvolatile memory;
    (e) retrieving the image corresponding to the data message from the nonvolatile memory;
    (g) sending the image to a printing apparatus; and
    (h) printing the image with the printing apparatus.

2. The method as claimed in claim 1 wherein the image corresponding to the data message is a bit mapped image.

3. The method as claimed in claim 1 wherein the data structure stored in nonvolatile memory comprises arrays of corresponding field definition and font data.

4. A method of printing using a postage evidencing device comprising:
    (a) storing a data structure and data definitions in a nonvolatile memory, the data structure including data for generating a print image and creating a data message and the data definitions corresponding to the data for generating a print image;
    (b) retrieving with a first microprocessor the data structure and the data definitions from the nonvolatile memory;
    (c) sending the data structure and data definitions to a second microprocessor for processing into a data message;
    (d) processing, with the second microprocessor, the data structure and data definitions to create the data message;
    (e) sending the data message to a printer control device, the control device capable of retrieving a corresponding image in nonvolatile memory;
    (f) retrieving the image corresponding to the data message from the nonvolatile memory;
    (g) sending the image to a printing apparatus; and
    (h) printing the image with the printing apparatus.

5. The method as claimed in claim 4 wherein the image corresponding to the data message is a bit mapped image.

6. The method as claimed in claim 4 wherein the data structure stored in nonvolatile memory comprises arrays of corresponding field definition and font data.

7. A postage meter for printing images comprising:
    a nonvolatile memory for storing data structures and data definitions for generating print images;
    a microprocessor for processing print data using print manager software and data providing software, the data-providing software for processing image data and data definitions to create a data message;

a control device, the control device for retrieving an image corresponding to the data message from the nonvolatile memory; and a print apparatus for printing images;

whereby the print manager software receives the data message from the data providing software and the control device retrieves corresponding print images from the nonvolatile memory and sends the print images to the print apparatus for printing.

8. The postage meter device as claimed in claim 7 wherein the control device is an application specific integrated circuit.

9. The postage meter device as claimed in claim 7 wherein the image data includes bit mapped images.

10. The postage meter device as claimed in claim 7 wherein the data structure stored in nonvolatile memory comprises arrays of corresponding field definition and font data.

11. The postage meter device as claimed in claim 7 wherein the microprocessor is removable from the postage meter device.

12. The postage meter device as claimed in claim 7 wherein the microprocessor is removable from the postage meter device.

13. A postage meter device for printing images comprising:

a print apparatus comprising:

a nonvolatile memory for storing data structures and data definitions for generating print images;

a first microprocessor for processing print data using print manager software;

a control device, the control device for retrieving an image corresponding to the data message from the nonvolatile memory;

print heads for printing images; and a meter apparatus comprising:

a second microprocessor for processing image data and data definitions to create a data message using data providing software;

whereby the print manager software receives the data message from the data providing software and the control device retrieves corresponding print images from the nonvolatile memory and sends the print images to the printing heads.

14. The postage meter device as claimed in claim 13 wherein the control device is an application specific integrated circuit.

15. The postage meter device as claimed in claim 13 wherein the image data includes bit mapped images.

16. The postage meter device as claimed in claim 13 wherein the data structure stored in nonvolatile memory comprises arrays of corresponding field definition and font data.

17. The postage meter device as claimed in claim 13 wherein the microprocessor is removable from the postage meter device.

* * * * *